United States Patent [19]

Driggers

[11] Patent Number: 4,798,185

[45] Date of Patent: Jan. 17, 1989

[54] STRESS-LIMITING FLEXIBLE THROTTLE LEVER APPARATUS FOR A GASOLINE ENGINE DRIVEN POWER TOOL OR THE LIKE

[75] Inventor: Bernard M. Driggers, Shreveport, La.

[73] Assignee: White Consolidated Industries, Inc., Cleveland, Ohio

[21] Appl. No.: 134,223

[22] Filed: Dec. 17, 1987

[51] Int. Cl.[4] ............................................. F16C 1/10
[52] U.S. Cl. .................................... 123/400; 74/502.2
[58] Field of Search .......... 74/501 A, 501 R, 501.5 R; 123/400

[56] References Cited

U.S. PATENT DOCUMENTS

| | | | |
|---|---|---|---|
| 2,070,994 | 2/1937 | McGrath | 74/501 R X |
| 2,829,534 | 4/1958 | Buxton et al. | 74/488 |
| 3,023,634 | 3/1962 | Tozza | 74/501 A X |
| 3,645,151 | 2/1972 | Yoshikawa | 74/551.9 |
| 3,733,922 | 5/1973 | Tripp | 74/523 |
| 3,845,847 | 11/1974 | Camp | 192/35 |
| 3,856,123 | 12/1974 | Kinsey | 192/3.62 |
| 3,903,679 | 9/1975 | Sorenson et al. | 56/11.6 |
| 3,948,361 | 4/1976 | Carlson | 188/24 |
| 3,960,032 | 6/1976 | Schiff | 74/501 R |
| 4,066,154 | 1/1978 | Ross | 74/501.5 R X |
| 4,263,818 | 4/1981 | Ozaki | 74/475 |
| 4,275,280 | 6/1981 | Yamazaki | 200/61.85 |
| 4,307,625 | 12/1981 | Lauzier | 74/489 |
| 4,318,307 | 3/1982 | Kine | 74/489 |
| 4,343,201 | 8/1982 | Shimano | 74/475 |
| 4,425,819 | 1/1984 | Shimano | 74/489 |
| 4,438,658 | 3/1984 | Carlson | 74/501 A |

OTHER PUBLICATIONS

Shindaiwa—Instruction Manual—Shindaiwa T-20 Owner's Manual—2 pages. (no date).
Robin Grass Cutter Model NB23T—Instruction Manual—Fuji Robin Industries Ltd.—3 pages. (no date).
Echo Weed & Grass Trimmer GT-140B GT-200A Operator's Manual—3 pages. (no date).
McCulloch Corporation Owner's Operation, Maintenance & Safety Manual—MAC 60A String Trimmer—McCulloch Corp., 2 pages, ©1985.
McCulloch Owner's Operation and Maintenance Manual—Mac 60-A, 80A, 90A—McCulloch 1982—2 pages, ©1982.
Overtravel Extension Springs—Capro Inc.—2 pages. (no date).

*Primary Examiner*—Tony M. Argenbright
*Assistant Examiner*—Eric R. Carlberg
*Attorney, Agent, or Firm*—Hubbard, Thurman, Turner & Tucker

[57] ABSTRACT

The pivotally mounted throttle lever on a gasoline engine powered flexible line trimmer has a flexible arm portion which is linked to the engine's pivotally mounted carburetor throttle arm by an elongated cable structure. When the linkage structure is in a "short" portion of its lengthwise dimensional tolerance range the throttle lever stroke distance is greater than that required to move the throttle arm to its fully open, actuated limit position in which it is stopped by an abutment surface. The throttle lever, when the throttle arm has been moved to such limit position, thus still has an unused position of its total available stroke distance. When the lever is forcibly driven through this remaining stroke portion, the flexible connecting arm is resiliently bent relative to the balance of the throttle lever to thereby avoid undesirably high stress levels in the throttle lever, the linkage cable and the carburetor throttle arm. The use of this simple and inexpensive flexible connecting arm eliminates the necessity of providing auxiliary structure for adjusting the lever stroke distance and/or the effective length of the linkage cable.

29 Claims, 4 Drawing Sheets

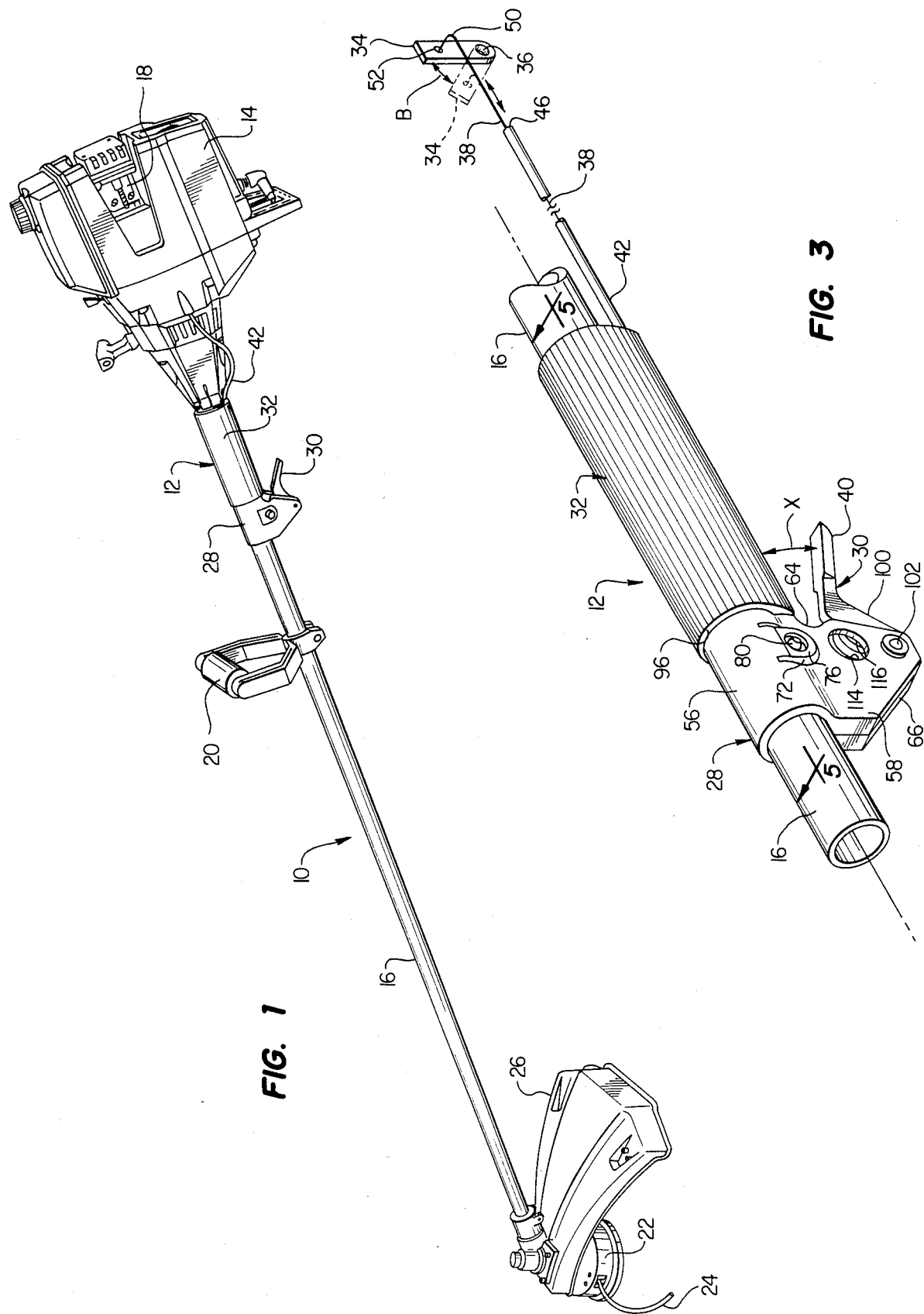

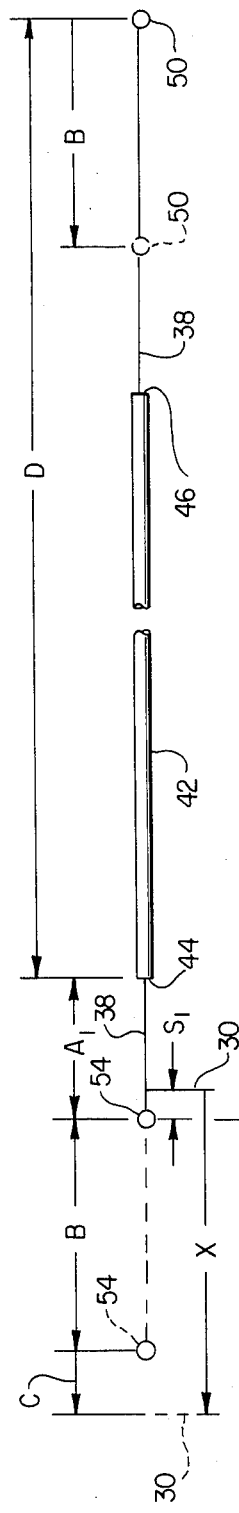
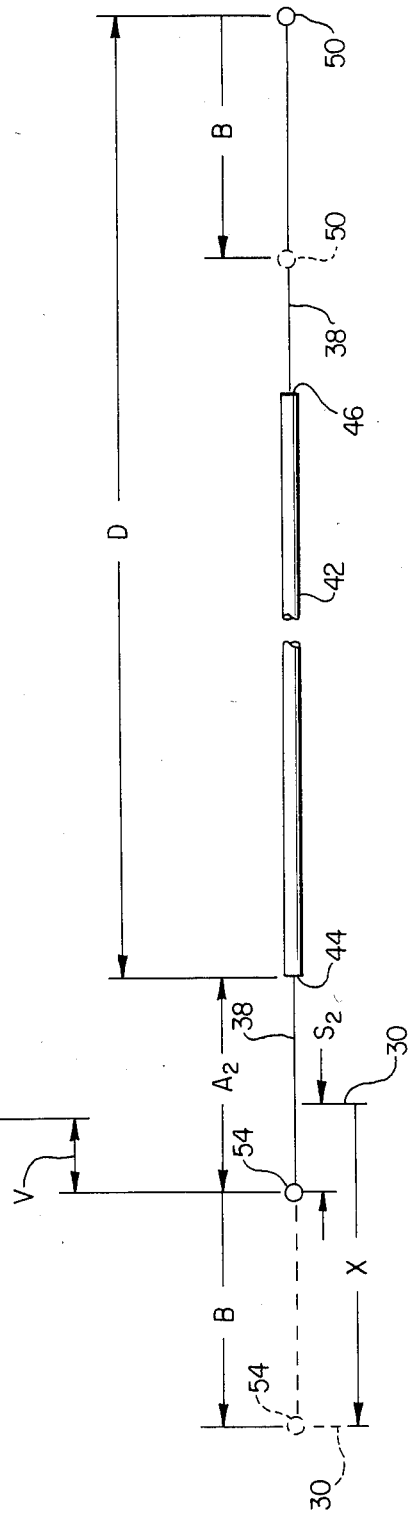
FIG. 2A
FIG. 2B

STRESS-LIMITING FLEXIBLE THROTTLE LEVER APPARATUS FOR A GASOLINE ENGINE DRIVEN POWER TOOL OR THE LIKE

BACKGROUND OF THE INVENTION

The present invention relates generally to portable power tools and associated control systems therefor, and more particularly provides a unique stress-limiting flexible throttle lever structure for use in a gasoline engine driven power tool such as a flexible line trimmer, lawn edger, brush cutter or the like.

To control engine speed on a gasoline engine driven power tool of these and various other types, it is customary to provide a finger operated, pivotally mounted throttle lever which is connected via a suitable cable member to the engine's pivotally mounted carburetor throttle arm. By pivoting the throttle lever between its pivotal limit positions the carburetor may be operated at its idle position, its fully open position, or at any selected intermediate position therebetween.

As is well known, various dimensional inaccuracies, within a permissible tolerance range, are invariably present in the interconnecting cable and its associated throttle lever and carburetor throttle arm connecting structure. The result of these unavoidable dimensional inaccuracies is that the maximum stroke distance through which the carburetor throttle arm may be moved is not always precisely matched to the maximum stroke distance through which the throttle control lever may be moved. More specifically, in some instances the maximum stroke distance of the throttle lever is greater than that required to move the carburetor throttle arm through its maximum stroke.

When this particular dimensional combination arises, it is possible to move the throttle arm to its open limit position (in which the arm is typically moved against a motion limiting abutment) by moving the throttle control lever through only a portion of its available stroke distance. An attempt to force the throttle lever through the remainder of its stroke distance can accordingly impose undesirably high stress levels on the throttle lever, the cable and/or the carburetor throttle arm held in its open limit position. In turn, this can break or damage the throttle lever, the interconnecting cable, or the carburetor throttle arm.

A conventionally utilized solution to this dimensional variance problem has been to provide adjustment means for compensating for the mismatch between the stroke distances of the throttle control lever and carburetor throttle arm. Such adjustment means typically take the form of auxiliary adjustment structure incorporated into the overall throttle linkage structure and operative to vary the effective length of the interconnecting cable and/or increase or reduce the actual length of the throttle lever stroke distance.

The conventional need to incorporate such auxiliary adjustment structure gives rise to a variety of problems, limitations and disadvantages. For example, the need to utilize such auxiliary adjustment structure adds to both the material and assembly labor costs of the finished tool. There is additionally an added labor cost required to properly adjust the stroke compensating structure at the time of manufacture. Moreover, the use of such adjustment structure increases the difficulty encountered by the user of the tool in servicing the throttle control system and can lead to incorrect adjustment of the system by the user. Finally, the very existence of this adjustment structure gives rise to the need for periodic adjustment thereof by the user over the life of the system, together with similar adjustment when any component of the system is serviced or replaced.

It is accordingly an object of the present invention to provide improved throttle control apparatus which eliminates or minimizes above-mentioned and other problems, limitations and disadvantages typically associated with conventional adjustable throttle lever and associated linkage apparatus.

SUMMARY OF THE INVENTION

In a preferred embodiment thereof, the present invention uniquely provides improved throttle lever control apparatus which automatically compensates for dimensional variations in the linking cable structure interconnected between the throttle control lever and carburetor throttle arm in an internal combustion engine, and safely limits the actuation stress which can be imposed on the throttle lever, the cable or the carburetor arm, without the previous necessity of providing auxiliary lever travel or cable length adjustment structure, even though the stroke distance through which the throttle lever may be moved substantially exceeds that required to move the carburetor throttle arm to its actuated limit position.

In such preferred embodiment, the improved throttle lever apparatus of the present invention is incorporated in a gasoline engine driven flexible line trimmer and comprises a throttle lever housing which is adjustably secured to the trimmer shaft closely adjacent an end of an elongated hollow cylindrical operator handgrip which coaxially circumscribes the shaft and is also secured thereto. A generally rigid molded plastic throttle lever body is secured at one end to the housing for pivotal movement relative thereto through a fixed, nonadjustable pivotal stroke distance.

Molded integrally with, or otherwise suitably secured to the throttle lever body is a resiliently flexible connecting arm which projects outwardly from the throttle lever body and is disposed within the housing. The outer end of this flexible arm is releasably connected to an end of a sheathed cable member which extends longitudinally through an opening formed in the handgrip and is operatively connected at its opposite end to a pivotally mounted throttle arm member on the engine's carburetor. When the throttle lever body is pivoted toward the handgrip, the flexible arm moves the cable away from the carburetor to pivot its throttle arm towards its fully opened position. When the throttle lever is released, a small spring element disposed within the throttle lever housing and bearing against the lever body biases the body toward a normal at rest position in which the lever body is pivoted away from the handgrip.

The outer end of the flexible lever arm portion disposed within the throttle lever housing is pivoted by the throttle lever body into and out of engagement with a single clamping and stop screw member extending through the housing and used to clamp the same to the shaft, the interengagement between the screw and the outer flexible arm end portion limiting the pivotal travel of the lever toward its spring-biased at rest position.

The throttle lever accordingly has a fixed, nonadjustable stroke distance limited at one end by the handgrip and at the other end by the housing clamping and stop screw member. By removing this screw, the throttle lever may be further pivoted away from the handgrip beyond its at rest position to swing the outer flexible arm end outwardly of the housing to facilitate the installation and removal of the outer cable end to and from the throttle lever structure.

The lengthwise dimensional tolerance range of the installed cable structure, and the connecting structure associated therewith, is correlated with the fixed stroke distance of the throttle control lever in a manner such that when the overall cable linkage structure is at the "long" end of its dimensional tolerance range it has a predetermined slack length, and the total throttle lever stroke distance is sufficient to take up this cable slack and additionally cause the flexible throttle lever arm to fully pivot the carburetor throttle arm to its actuated stop position when the throttle lever is moved to its fully depressed position against the handgrip.

When the cable linkage structure is at the "short" end of its permissible lengthwise tolerance range, it has a considerably smaller degree of slack when operatively connected to the flexible lever arm portion. Accordingly, only a portion of the total throttle lever throw distance is thus required to pivot the carburetor throttle arm to its actuated limit position in which it is brought into abutment with a cooperating stop surface. At this point, the throttle lever body is still spaced outwardly from the handgrip and has a significant portion of its total stroke distance left.

It is, of course, the natural tendency of the typical trimmer operator to try to pivot the throttle lever to its completely depressed position to assure that the carburetor is wide open. In conventional throttle lever structures, absent the proper setting of their auxiliary lever throw and/or cable length adjustment structures, further pivotal movement of the lever after the carburetor has been fully opened can easily break or damage the throttle lever, the interconnecting cable structure or the carburetor throttle arm.

This possibility is uniquely eliminated in the present invention by the operation of the flexible throttle lever arm. Specifically, in the event that the throttle lever has been moved through only a portion of its total pivotal stroke distance and at that point has fully opened the carburetor, the lever may be forcibly pivoted through the remainder of its stroke distance, into abutment with the handgrip, without unduly increasing the actuating stresses on the essentially rigid throttle lever body, the interconnecting cable structure or the carburetor throttle arm. As the throttle control lever is being forcibly pivoted through its excess stroke distance portion, the outer end of the flexible lever arm portion remains in an essentially stationary position and the flexible arm resiliently bends relative to the rigid body portion of the lever to hold the carburetor throttle arm in its fully open pivoted position, yet protect the throttle lever body, the cable, and the carburetor throttle arm from potentially damaging high actuating stress levels.

The improved throttle control apparatus of the present invention, in addition to the aforementioned stress-relieving aspects thereof, provides a variety of other advantages over conventional throttle lever apparatus. For example, the improved throttle lever apparatus eliminates the cost of providing and assembling stroke and/or cable adjustment structure in addition to eliminating the labor cost required to adjust such structure at the time of manufacture of the trimmer. Additionally, no such adjustment is required on the part of the consumer and the lever structure is not appreciably susceptible to incorrect adjustment by the consumer.

While in a preferred embodiment thereof the throttle control of the present invention is incorporated in a portable gasoline engine driven power tool such as a flexible line trimmer, it will be readily apparent to those skilled in the art that the principles of such invention are applicable as well to a wide variety of other control system applications in which the operating member of a controlled element is to be moved through an operating distance in response to movement of an actuating member interconnected by substantially inextensible linkage means to the operating member.

BRIEF DESCRIPTION OF THE DRAWINGS

FIG. 1 is a perspective view of a representative gasoline engine powered flexible line trimmer having a specially designed throttle lever and control handle assembly that embodies principles of the present invention;

FIGS. 2A and 2B are simplified schematic diagrams conceptually illustrating the interaction between the throttle lever and a throttle cable portion of the trimmer;

FIG. 3 is an enlarged scale, partially fragmented perspective view of the assembly, a portion of the trimmer shaft on which the assembly is mounted, and the throttle cable and carburetor throttle control arm connected to the assembly;

DETAILED DESCRIPTION

Figure 4:
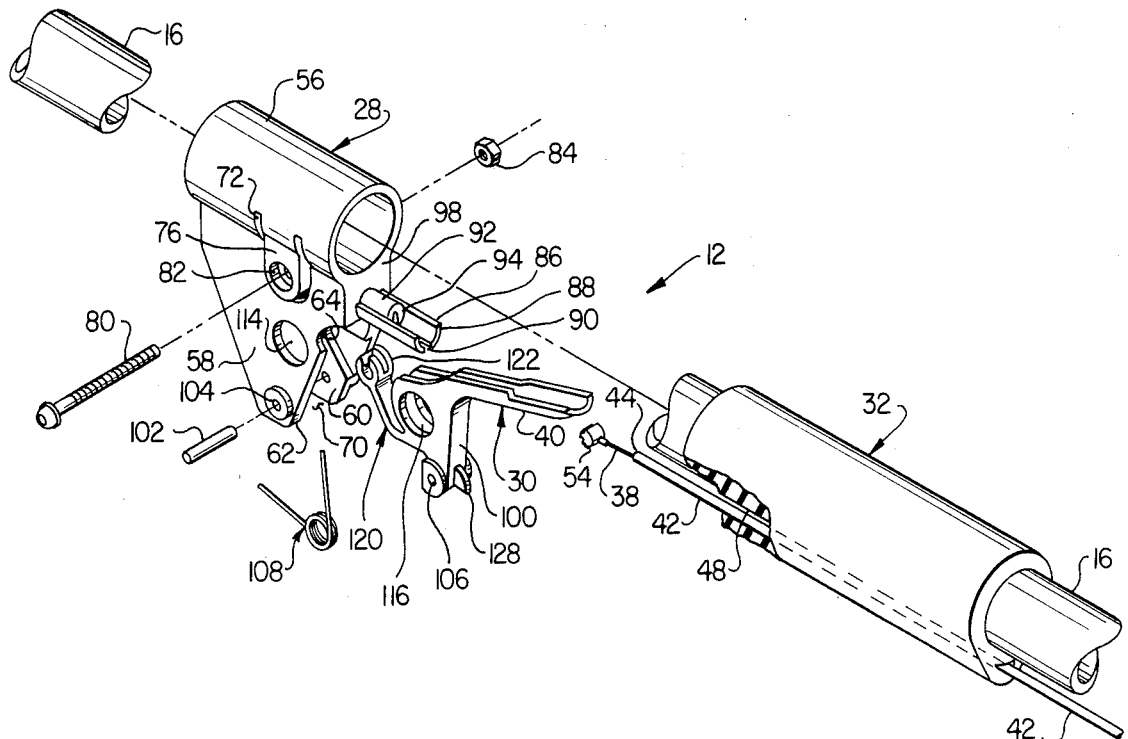
FIG. 4 is a partially cut away exploded perspective view of the assembly.

Perspectively illustrated in FIG. 1 is a representative gasoline engine powered flexible line trimmer 10 into which a unique throttle lever and control handle assembly 12, embodying principles of the present invention, is incorporated. The gasoline engine which drives the trimmer 10 is disposed within a shroud structure 14 secured to one end of an elongated shaft 16 outwardly adjacent the assembly 12, the engine being provided with a carburetor 18. An operator control handle 20 is mounted on the shaft 16 forwardly of the assembly 12, and a rotationally drivable cutting head 22 is operatively secured to the lower left end of the shaft. The cutting head 22 is driven by the engine via a flexible drive shaft structure (not illustrated) disposed within the shaft 16. During operation of the trimmer 10, the rapidly rotating cutting head 22 swings an outwardly projecting length of flexible cutting line 24 in a circular cutting plane to trim various types of vegetation into which the cutting plane is moved. To protect the trimmer operator from the rapidly whirling line segment 24, a protective shroud member 26 is also secured to the lower left end of the shaft 16 above the cutting plane.

Referring now to FIGS. 1 and 3, in a preferred embodiment thereof the throttle lever and handle assembly 12 includes a molded plastic throttle lever housing 28, an essentially rigid molded plastic throttle lever body 30 pivotally connected to the housing 28, and a hollow, generally cylindrical resilient rear operator handgrip 32 which coaxially circumscribes the shaft 16 and is closely interposed between the throttle lever housing 28 and the shroud structure 14.

The carburetor 18 is provided with a throttle arm member 34 which is pivotable about a point 36 between the spring-biased, solid line closed position depicted in FIG. 3, and the dotted line open position in which the throttle arm member brings the carburetor butterfly valve (not illustrated) to its fully open position and the arm member 34 is brought into abutment with a stop surface (also not illustrated) which limits the counterclockwise rotation of the arm member 34.

The pivotal movement of the arm 34 between its solid and dotted line positions depicted in FIG. 3, through a pivotal arc or operating distance B, is effected by translational movement of an elongated, substantially inextensible metal cable member 38 in response to pivotal movement of the throttle lever body 30 through an actuating arc or stroke distance X. At one end of this arc, the throttle lever body 30 is in a fully extended position shown in FIG. 3, and the throttle arm 34 is in its solid line position. At the other end of the arc X, the lever body 30 is in a fully depressed position (FIG. 5B) in which an outer end portion 40 of body 30 abuts the handgrip 32, and the carburetor throttle arm 34 is in its dotted line position in FIG. 3.

The cable 38 is slidably disposed in a conventional manner within a flexible sheath 42 having an outer end 44 (FIG. 4) and an inner end 46 (FIG. 3). Sheath 42 is extended axially through a small passage 48 (FIGS. 4 and 5A) formed through a lower side portion of the handgrip 32. At the right end of the handgrip 32 (FIG. 1) the sheath exits the handgrip internal passage and is then extended through the interior of the shroud structure 14 to adjacent the carburetor 18. An appropriately configured inner end portion 50 of the cable 38 (FIG. 3) is suitably connected at point 52 to the carburetor throttle arm member 34, while an outer end portion of the cable has secured thereto a small cylindrical connector member 54 (FIG. 4) which, in a manner subsequently described, is operatively associated with the throttle control lever body 30 for actuating movement thereby.

Before further describing the structure and operation of the throttle control lever and its associated housing structure 28, reference is now made to the schematic diagrams of FIGS. 2A and 2B for a general discussion of the problem which the present invention uniquely and quite inexpensively solves. In these diagrams, several simplifications and assumptions have been made for illustrative clarity. For example, the cable 38 and its associated sheath 42 are illustrated in a perfectly straight orientation. Additionally, the pivotal stroke arcs B and X of the throttle arm 34 and the throttle lever body 30 have been straightened (and are not to scale) for easier comparison therewith to various corresponding movements of the cable structure's inner and outer connecting end portions 50 and 54.

In manufacturing the throttle lever, interconnecting cable, and carburetor throttle arm structure generally described above, there is a permissible lengthwise tolerance range associated with the interconnecting linkage means defined by the cable 38, the sheath 42 and the connecting structure associated with the cable member. For purposes of discussion, it will be assumed herein that, when such linkage means are at the "short" end of their dimensional tolerance range, as schematically depicted in FIG. 2A, the overall length thereof is represented by the sum of the lengths D and $A_1$. The distance D is equal to the cable length between the inner connecting cable end portion 50 and the outer sheath 44 when the throttle arm 34 is in the solid position thereof depicted in FIG. 3. As subsequently described, the outer sheath end 44 is held in abutment with a stop surface formed on the throttle lever housing 28. The distance $A_1$ is equal to the distance between the outer sheath end 44 and the outer cable end connector member 54 when the throttle lever 30 is in its pivotally extended "at rest" solid line position in FIG. 2A.

When the cable linkage means are at the "long" end of their permissible lengthwise dimensional tolerance range (FIG. 2B), the overall length thereof is equal to the sum of the distances D and $A_2$, the distance $A_2$ being greater than the corresponding distance $A_1$ in FIG. 2A by the length V which represents the overall lengthwise dimensional variance in the cable linkage means. For purposes of easy comparison of these two dimensional tolerance limits, the difference in the overall linkage means lengths have been illustrated as being defined entirely by the difference in the distances $A_1$ and $A_2$ of the cable lengths extending leftwardly of the outer sheath end 44. It will be appreciated however, that this length differential could actually occur along other portions of the cable linkage structure.

In the throttle control system into which principles of the present invention are incorporated, the permissible lengthwise tolerance range of the cable linkage means is correlated with the stroke distance X of the throttle lever arm 30 in a manner such that when the linkage means are at the long end of such range, as in FIG. 2B, there is a permissible "slack" distance $S_2$ in the installed cable linkage such that the movement of the lever 30 through its full stroke distance X takes up this cable slack and additionally moves the cable end portions 50, 54 through a distance sufficient to move the carburetor throttle arm 34 through its full operating distance B at or closely adjacent the point at which the throttle lever 30 is brought into abutment with the handgrip 32.

However, when the cable linkage is at the short end of its lengthwise dimensional tolerance range, (FIG. 2A), a slack distance $S_1$ is present which is substantially shorter than the slack distance $S_2$. Accordingly, when the throttle lever 30 has been pivoted to a point at which the slack $S_1$ has been taken up and the throttle arm 343 has been moved through its pivotal operating distance B to its abutment limit position, a sometimes substantial stroke portion C remains out of the total available throttle lever stroke distance X. Stated in another manner, when the throttle arm 34 has been moved to its actuated limit position, the throttle control lever is still spaced outwardly from the handgrip 32 and all of the slack in the cable has been removed. Accordingly, an attempt to force the throttle lever 30 through the remaining balance C of its stroke distance X (to the dotted line position of the lever 30 in FIG. 2A) could, in conventional throttle control assemblies of this general type, create undesirably high stress levels in one or more of the throttle lever, the cable linkage, and the carburetor throttle arm, thereby breaking or damaging one or more of these components. In conventional systems of this general type, a common solution has been to provide auxiliary adjustment means operable to selectively adjust the lever stroke distance X and/or the overall operative length of the cable linkage.

As will subsequently be described, however, the present invention uniquely eliminates the necessity for providing such auxiliary adjustment means while at the same time permitting the throttle lever stroke distance X to be very simply maintained at a fixed, nonadjustable magnitude and essentially eliminating the possibility of breaking or damaging the lever body 30, the cable 38, or the carburetor throttle arm 34 when the lever stroke distance X is greater than that required to move the throttle arm 34 through its full operating arc B.

Figure 5A:
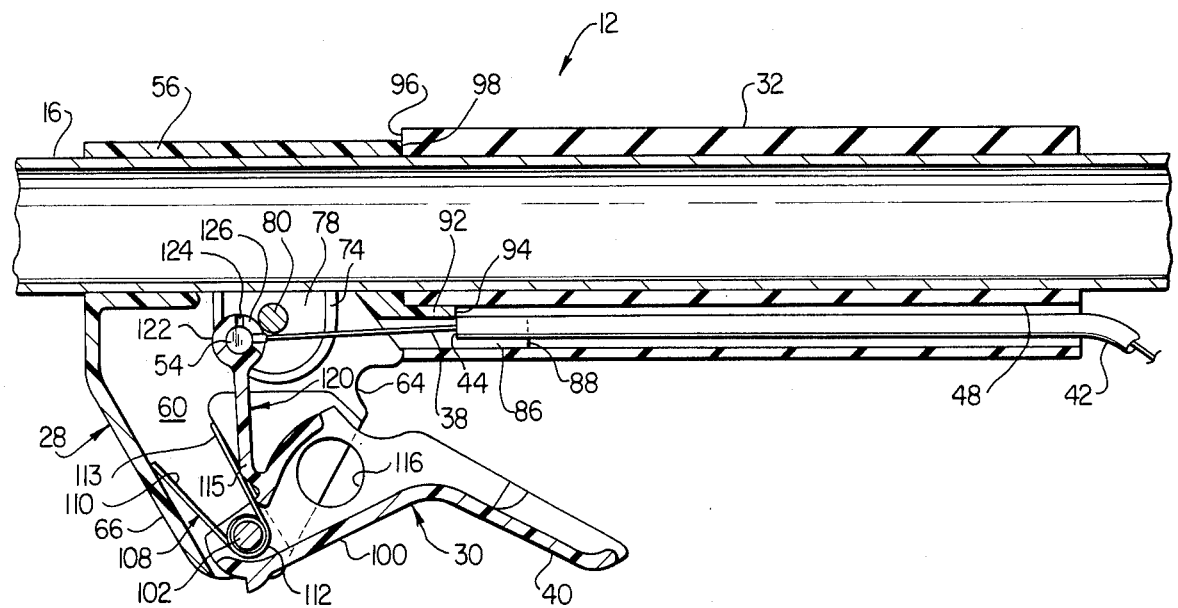
FIGS. 5A-5E are enlarged scale cross-sectional views taken through the assembly along line 5—5 of FIG. 3. and illustrate the operation and advantages thereof.

Referring now to FIGS. 4 and 5A, the throttle lever housing 28 has a hollow cylindrical base portion 56 which is coaxially mounted on the shaft 16. Depending in a spaced relationship from the base portion 56 are a pair of housing side walls 58 and 60 having curved lower ends 62 and curved access notches 64 formed in rear side edges of the side walls. A front wall 66 (FIG. 5A) extends between front side edges of the walls 58 and 60, and a rear wall 68 extends between upper portions of the rear side wall edges, thereby forming an opening 70 into the interior of the housing below its base portion 56.

A pair of U-shaped slots 72, 74 are respectively formed in upper portions of the side walls 58, 60 to form therein clamping tabs 76, 78 which extend below the housing base portion 56. Base portion 56 is securely clamped to the shaft 16 by means of a clamping and stop screw 80 which extends through aligned openings 82 in the clamping tabs and is threaded into a nut 84 to draw the tabs 76, 78 tightly against the shaft 16.

Extending rearwardly from the front housing wall 98 is a projection 86 having a semi-circular cross-section along its length, an outer end surface 88, and a cable slot 90 formed through a lower side portion thereof. Formed within an inner end portion of the projection 86 is somewhat shorter cylindrical member 92 having an outer end surface 94. With the lever and handle structure 12 in the assembled state depicted in FIG. 5A, the left end surface 96 of the handgrip 32 abuts the rear end surface 98 of the housing base portion 56, the outer end of the projection 86 extends rightwardly into the sheath passage 48, and the end surface 94 of the projection 92 abuts the outer sheath end 44.

The elongated, essentially rigid plastic throttle lever body 30 has an inner end portion 100 which is received between lower end portions of the housing side walls 58, 60 and is pivotally mounted thereto by a pivot pin 102 extended through aligned openings 104 formed through the side walls and a corresponding opening 106 formed through the inner lever end portion 100 which, as illustrated, is angled relative to the outer lever end portion 40. The lever body 30 is biased toward its outwardly pivoted limit position depicted in FIG. 5A by means of an elongated spring element 108 which is disposed between the housing side walls 58, 60 and has a first end portion 110 bearing against the inner surface of the front housing wall 66, a coiled central portion 112 wrapped around the pivot pin 102, and an opposite end portion 113 bearing against an inner end portion 115 of the flexible connecting arm 120 as best illustrated in FIG. 5A.

Figure 5B:
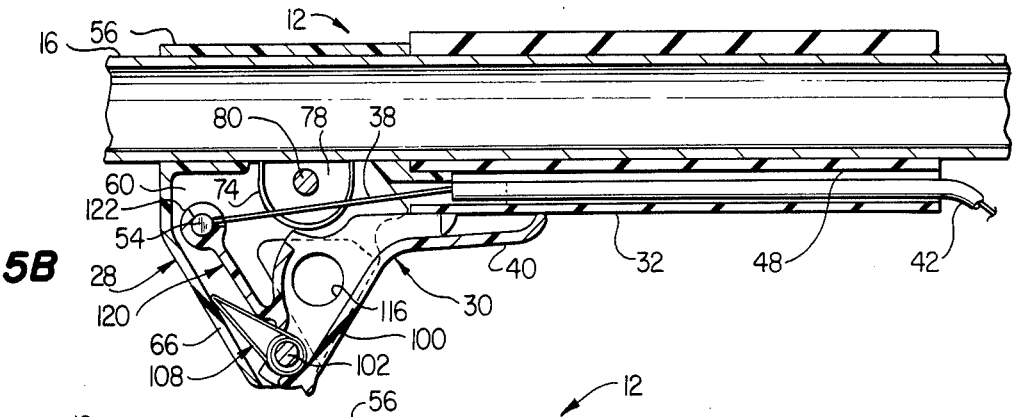

To permit the lever body 30 to be releasably locked in its fully depressed position as illustrated in FIG. 5B, alignable circular openings 114, 116 are respectively formed in the housing side wall 58 and the inner end portion 100 of the throttle lever 30. When the lever 30 is pivoted to its fully depressed position, these openings 114, 116 are brought into registry so that a suitable locking member (not illustrated) may be releasably inserted into the aligned openings to temporarily prevent the spring element 108 from pivoting the lever 30 back to its "at rest" position.

Still referring to FIGS. 4 and 5A, the previously mentioned stress relieving and adjustment structure eliminating features of the present invention are provided by a uniquely operative resiliently flexible connecting arm 120 which is molded integrally with, or otherwise suitably secured to, the essentially rigid plastic lever body 30 and is disposed within the throttle lever housing 28 between the side walls 58 and 60. The flexible arm 120 is of an elongated configuration and projects outwardly from the inner lever end portion 100 toward the shaft 16.

At the outer end of the flexible arm 120 is a hollow cylindrical cable connection portion 122 which removably receives the cylindrical cable connector member 54. The connection portion 122 is suitably slotted, as at 124 and 126, to facilitate the insertion and removal of the connector member 54, and to receive and permit movement of an outer end portion of the cable 38 relative to the connection portion 122. It will be appreciated that alternative means for connecting the cable to the flexible connecting arm could be utilized if desired. As best illustrated in FIG. 5A, with the lever body 30 in its clockwise limit position, the connection portion 122 is brought rightwardly into engagement with the stop screw 80 to thereby limit the clockwise pivotal motion of the throttle lever 30 urged by the spring element 108.

The unique system stress relieving action of the flexible connecting arm 120 will now be described. As can be seen by comparing FIGS. 5A and 5B, when the cable linkage structure is at the "long" end of its permissible lengthwise dimensional tolerance range, pivotal movement of the throttle lever 30 from its at rest position (FIG. 5A) through its full stroke distance X to the lever's fully depressed position (FIG. 5B) pivots the flexible connecting arm in a counterclockwise direction, moving the flexible arm outer end portion 122 leftwardly away from the stop screw 80 and bringing it into adjacency with the inner surface of the forward housing wall 66. This resulting movement of the connecting arm 120 brings the carburetor throttle arm 34 to its fully open, dotted line position in FIG. 3. The flexible arm 120 is sized and configured so that in this orientation it does not appreciably bend relative to the inner throttle lever end portion 100 to which it is secured at its inner end.

Figure 5C:
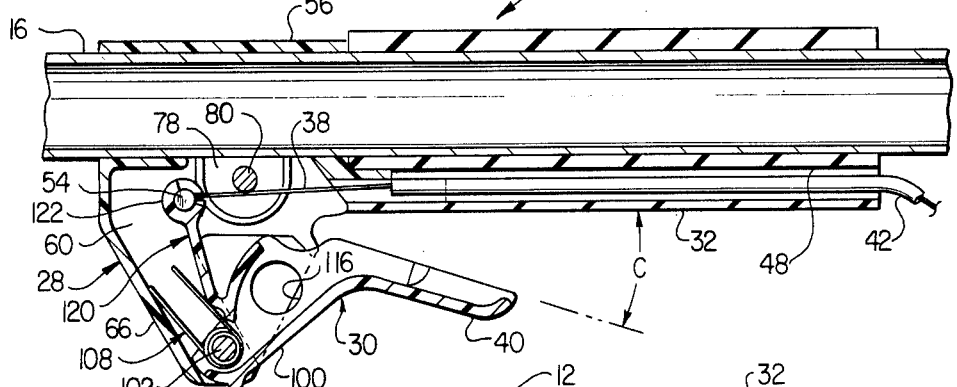

However, when the cable linkage structure is at the "short" end of its permissible lengthwise dimensional tolerance range, pivotal movement of the lever body 30 from the position thereof depicted in FIG. 5A to its only partially depressed position depicted in FIG. 5C pivots the flexible arm 120 a substantially shorter distance leftwardly away from the stop screw 80, but a sufficient distance therefrom to move the throttle lever 34 to its dotted line, actuated stop position shown in FIG. 3. As in the case of its position shown in FIG. 5B, the arm 120 still has not flexed to an appreciable degree relative to the throttle lever, and the lever has a remaining, unused stroke distance portion C which was conceptually discussed in conjunction with the schematic diagram in FIG. 2A.

Figure 5D:
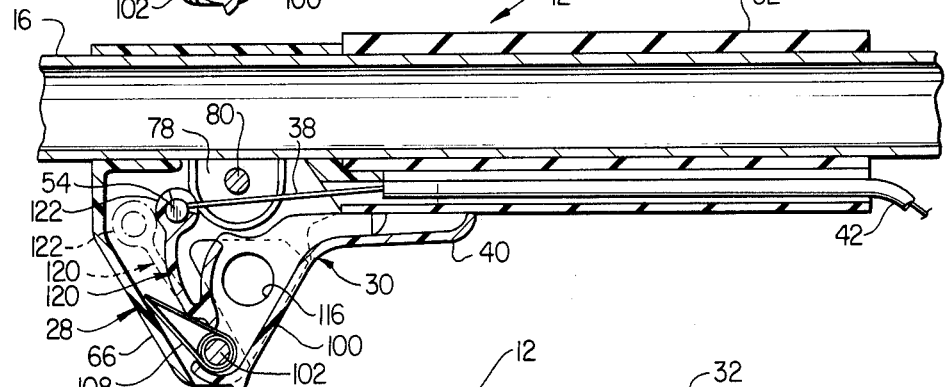

Pivotally driving the throttle lever 30 through its unused stroke distance portion C, to the lever position depicted in FIG. 5D, causes the arm 120 to flex relative to the balance of the lever 30 in a manner such that the outer end connection portion 122 of the arm remains an essentially the same position as that depicted in FIG. 5C instead of being simply driven to the dotted line position shown in FIG. 5D. It is this unique flexure of the connecting arm 120 which prevents an undesirably high actuating stress from being imposed upon the rigid lever body 30, the cable 38, or the throttle arm 34 when the stroke distance X of the lever 30 is greater than that required to move the throttle arm 34 through its operating distance B.

The resiliently flexible connecting arm 120 thus eliminates the previous necessity of providing auxiliary adjustment structure for selectively altering the lever stroke distance and/or the effective length of the cable 38. The fixed, nonadjustable stroke distance X of lever body 30, may accordingly be effectively "matched" to a linkage cable structure falling anywhere within the aforementioned permissible lengthwise tolerance range. It will be appreciated that if the cable linkage falls somewhere between the end points of such range, the arm 120 will still be flexed, but to a lesser degree than that depicted in FIG. 5D.

Figure 5E:
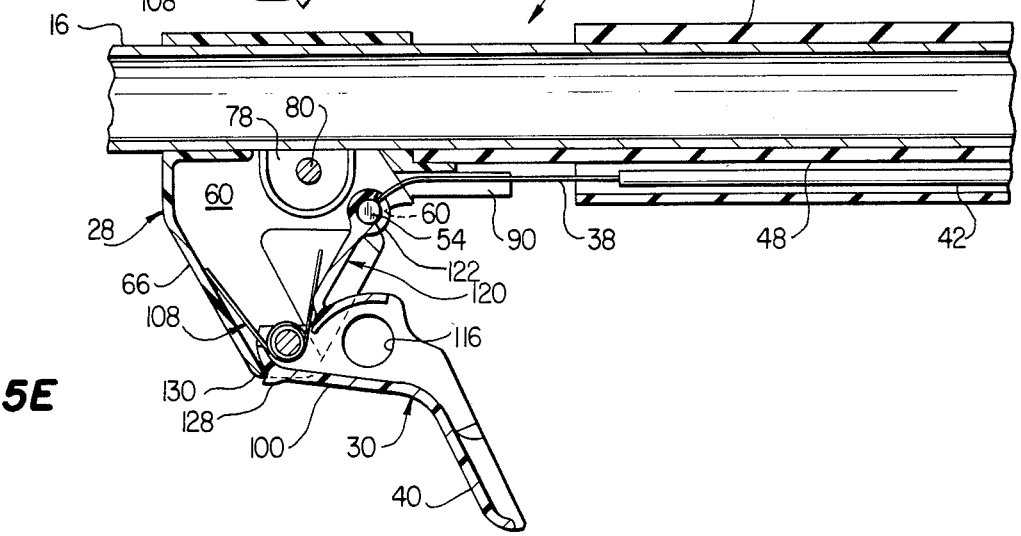

Referring finally to FIG. 5E, easy access is provided to the outer connection end portion 122 of the flexible connecting arm 120 by simply removing the stop screw 80, sliding the throttle lever housing 28 leftwardly away from the handgrip 32 along the shaft 16 to thereby cause the lever body 30 to be further pivoted in a clockwise direction beyond its normal limit position depicted in FIG. 5A. Such further clockwise pivoting of the lever body 30 moves the outer connecting arm end portion 122 across the stop screw holes 80, 82 until the cable connector 54 is brought into alignment with the housing sidewall edge surface notches 64. At this point, further clockwise rotation of the lever 30 is terminated by the engagement of a small tab portion 128 formed on the lever body portion 100 and the lower end surface 130 of the front housing wall 66. This prevents inadvertent damage (for example, kinking) to the cable. With the connector 54 in alignment with the notches 64, the connector can be easily slipped out of (or into) the connection portion 122 for servicing or replacement of the cable 38. All that is necessary to return the lever body 30 to its normal operating position is to pivot it in a counterclockwise direction until the outer connecting arm end portion 122 is swung past the screw holes 80 and 82, while moving the lever housing toward the handgrip, and then reconnecting the stop screw 80.

The described throttle control structure of the present invention significantly reduces both the material and labor costs required for its manufacture since, as discussed above, there is no need to provide cable or lever adjustment structure - the flexible connecting arm 120 automatically compensates for dimensional variances in the linkage cable structure. Additionally, since no adjustment mechanism is needed, there is nothing that can be adjusted improperly, no periodic adjustments are required, and no adjustments are required after servicing or replacement of any of the system components.

While the principles of the present invention have been described in conjunction with the flexible line trimmer 10, and the particular actuation mechanism described involves a pivotal actuation movement, a translational linkage movement, and a pivotal controlled movement, it will be readily appreciated by those skilled in this particular art that the principles of the present invention are readily applicable as well to a variety of alternate applications. For example, such principles could be applied to a variety of control systems having a controlled component with an operating member movable through an operating distance by a substantially inextensible linkage structure operated by an actuating member movable through a stroke distance having a variable relationship with the controlled component operating distance due to dimensional variations in the linkage structure. Additionally, the flexible connecting arm 120 could alternately assume a variety of alternate configurations and could be utilized in conjunction with actuating members having translational, rotational, sliding, or other types of actuating movements instead of the pivotal movement representatively described herein. Similarly, the described cable linkage structure is merely representative of a wide diversity of other linkage structures which could be alternatively employed.

The foregoing detailed description is to be clearly understood as being given by way of illustration and example only, the spirit and scope of the present invention being limited solely by the appended claims.

What is claimed is:

1. A control system comprising:
a controlled component having an operating member movable through an operating distance to control the operation of said component; and
actuating means for selectively moving said operating member through said operating distance, said actuating means including an actuating member having a body portion supported for movement relative to said operating member through a stroke distance and a flexible portion secured to said body portion and defining a portion of said actuating member, and substantially inextensible linkage means, interconnected between said operating member and said flexible portion of said actuating member, for moving said operating member through said operating distance in response to movement of said actuating member through said stroke distance, said flexible portion being adapted to be resiliently flexed relative to said body portion when said flexible portion exerts a predetermined force on said linkage means during movement of said actuating member through said stroke distance,
said linkage means having a permissible dimensional tolerance range related to said stroke distance in a manner such that in at least a portion of said dimensional tolerance range said stroke distance is greater than that required to move said operating member, via said linkage means, through said operating distance and movement of said actuating member through said stroke distance causes said flexible portion of said actuating member to exert said predetermined force upon said linkage means, thereby causing said flexible portion to resiliently flex relative to said body portion in a manner limiting the actuating force transmitted through said linkage means to a predetermined magnitude, whereby the maximum actuation stresses imposable upon said actuating member body portion, said linkage means and said operating member by movement of said actuating member through its full stroke distance are automatically limited to predetermined magnitudes without the necessity of otherwise compensating for dimensional variations in said linkage means.

2. The control system of claim 1 wherein:
said controlled component is an internal combustion engine carburetor,
said actuating member body portion is generally rigid and is supported for pivotal movement through said stroke distance, said flexible portion of said actuating member is a resiliently flexible member secured to said body portion and having an outer end portion, and said linkage means includes a cable member interconnected at opposite ends thereof between said operating member and said outer end portion of said flexible member.

3. The control system of claim 2 wherein:

said operating member is a throttle control arm pivotally associated with said carburetor.

4. A power tool comprising:

working means for receiving power from a source thereof and being responsively drawn to perform a predetermined work function;

power supply means operative to supply power to said working means, said power supply means having an operating member movable through an operating distance to a stop position to control the operation of said power supply means; and actuating means for moving said operating member through said operating distance, said actuating means including:

an actuating member movable through an actuating stroke distance, said actuating member having a resilient portion adapted to be flexed relative to the balance of said actuating member when a predetermined force is exerted upon said resilient portion, and a substantially inextensible linkage structure interconnected between said resilient actuating member portion and said operating member, and operative to move said operating member through said operating distance in response to movement of said actuating member through at least a portion of said stroke distance and, when only a portion of said actuating stroke distance is required to move said operating member through said operating distance, to exert said predetermined force on said resilient portion, thereby causing flexure thereof relative to said balance of said actuating member, as said actuating member is forcibly driven through said balance of said actuating stroke distance, whereby said flexible actuating member portion is operative to limit to predetermined magnitudes the actuating stresses imposable upon said operating member, said linkage structure, and said balance of said actuating member.

5. The power tool of claim 4 wherein:

said power supply means comprise an internal combustion engine having a carburetor, said operating member is a throttle control member movably associated with said carburetor, said actuating member is a throttle actuating member, and said linkage means include a cable member operatively interconnected between said resilient portion and said throttle control member.

6. The power tool of claim 5 wherein:

said throttle actuating member comprises a substantially rigid throttle lever body supported for pivotal movement through said actuating stroke distance, said resilient portion comprises a flexible arm extending outwardly from said lever body and having an outer end portion, and said cable member is interconnected between said outer end portion and said throttle control member.

7. The power tool of claim 6 wherein:

said throttle control member is a throttle control arm pivotally associated with said carburetor.

8. A power tool comprising:

an elongated shaft;

a rotationally drivable structure operatively secured to one end of said shaft;

an internal combustion engine operatively mounted on the opposite end of said shaft and drivingly connected to said rotationally drivable structure, said engine having a carburetor with an operating member movable through an operating distance to a limit position to control the operation of said carburetor;

a throttle lever having a substantially rigid body and resiliently flexible connecting arm means projecting outwardly therefrom and having an outer end portion;

mounting means for mounting said throttle lever body on said shaft for pivotal motion relative thereto from a first limit position through a pivotal stroke distance to a second limit position; and linkage means, including a cable member interconnecting said outer end portion of said connecting arm means and said operating member, for moving said operating member to said limit position thereof in response to pivotal movement of said throttle lever body from said first limit position thereof through at least a portion of said stroke distance toward said second limit position thereof, said stroke distance, when said linkage means are in a predetermined portion of a permissible lengthwise dimensional tolerance range thereof, being sized in a manner such that when said operating member is moved to its limit position by said linkage means an unused portion of said throttle lever body stroke distance remains, said connecting arm means being operative, in the event that said throttle lever body is forcibly pivoted through said unused stroke portion, to be flexed relative to said throttle lever body by said linkage means in a manner limiting to predetermined magnitudes the actuating stresses which may be imposed upon said throttle lever body, said linkage means and said carburetor operating member.

9. The power tool of claim 8 wherein:

said mounting means include mounting structure secured to said shaft, and said throttle lever body is secured to said mounting structure for pivotal movement through said stroke distance toward and away from said shaft.

10. The power tool of claim 9 wherein:

said carburetor operating member is a throttle arm pivotally associated with said carburetor.

11. The power tool of claim 8 wherein:

said mounting structure is a throttle lever housing releasably clamped to said shaft by a removable stop member engageable by said outer end portion of said connecting arm means to stop said lever body when it reaches said first limit position thereof.

12. The power of claim 11 wherein:

said throttle lever housing has a cylindrical body portion circumscribing said shaft, and a pair of side walls projecting outwardly from said body portion in a spaced apart, parallel, opposing relationship, said side walls having locking tab portions adapted to be drawn together to releasably clamp said housing to said shaft, said stop member extends through said locking tap portions and draws them together, said lever body has an end portion positioned between said side walls and pivotally connected to outer end portions thereof, and said connecting arm means are positioned between said side walls.

13. The power tool of claim 12 wherein said power tool further comprises:

spring means, disposed within said housing, for biasing said lever body toward said first limit position thereof.

14. The power tool of claim 12 wherein:

said side walls have side edge portions with aligned access notches formed therein:

said outer end portion of said connecting arm means is configured to receive and releasably retain a cable connector member, said cable member has a connector member secured to an end thereof and retained in said connecting arm means outer end portion, and said throttle lever and said housing are relatively configured in a manner permitting said throttle lever, when said stop member is removed, to be pivoted outwardly beyond said first limit position to a cable connector access position in which said cable connector is aligned with said access notches to expose said connector member for access thereto.

15. The power tool of claim 14 wherein said power tool further comprises:

interengageable portions formed on said lever body and said housing for stopping said lever at said cable connector access position thereof.

16. The power tool of claim 15 wherein:

said throttle lever housing is of a molded plastic material, said lever body is of a generally rigid molded plastic material, and said connecting arm means comprise an elongated, molded plastic connecting arm member fixedly secured at an inner end portion thereof to said lever body.

17. The power tool of claim 16 wherein:

said connecting arm member is integrally molded with said lever body.

18. The power tool of claim 8 wherein:

said lever body is of a generally rigid molded plastic material, and said connecting arm means comprise an elongated, molded plastic connecting arm member fixedly secured at an inner end portion thereof to said lever body.

19. The power tool of claim 18 wherein:

said connecting arm member is integrally molded with said lever body.

20. The power tool of claim 8 wherein:

said power tool is a flexible line trimmer, and said rotationally drivable structure is a cutting head assembly.

21. A portable rotary power tool comprising:

an elongated shaft;

a rotationally drivable structure operatively secured to one end of said shaft;

an internal combustion engine operatively mounted on the opposite end of said shaft, said engine having a carburetor with an operating member movable through an operating distance to a limit position to control the operation of said carburetor;

power transfer means for transferring power from said engine to said drivable structure to rotationally drive the same; and a throttle lever and control handle assembly mounted on said shaft inwardly adjacent said engine, said assembly including:

a generally cylindrical operator handgrip coaxially circumscribing said shaft adjacent said engine and having an axially extending cable passage passing therethrough, a throttle lever housing having a hollow body portion circumscribing said shaft adjacent an outer end of said handgrip, and a pair of side walls extending in a spaced, parallel, opposing relationship laterally outwardly from said body portion, said side walls having a pair of locking portions adapted to be drawn together to clamp said housing to said shaft, and a stop member extending through said locking portions and drawing the same together, a throttle lever having an elongated, generally rigid body connected between outer end portions of said side walls for pivotal movement from a first limit position through a pivotal stroke distance to a second limit position in which said lever body is brought into abutment with said handgrip, resiliently flexible, elongated connecting arm means secured at an inner end portion thereof to said lever body, positioned between said side walls, and having an outer end portion configured to releasably receive and retain a cable connector member, said stop member and said outer end portion of said connecting arm means being engageable to stop pivotal movement of said lever body at said first limit position thereof, and linkage means, including a cable interconnected between said outer end portion of said connecting arm means and said operating member, and extending through said cable passage in said handgrip, for moving said operating member to said limit position thereof in response to pivotal movement of said throttle lever body from said first position thereof through at least a portion of said stroke distance toward said second limit position thereof, said cable having an end mounted connector operatively received in said outer end portion of said connecting arm means, said stroke distance, when said linkage means are in a predetermined portion of a permissible lengthwise dimensional tolerance range thereof, being sized in a manner such that when said operating member is moved to its limit position by said linkage means, an unused portion of said throttle lever body stroke distance remains, said connecting arm means being operative, in the event that said throttle lever body is forcibly pivoted through said unused stroke distance portion, to be flexed relative to said throttle lever body by said linkage means in a manner limiting to predetermined magnitudes the actuating stresses which may be imposed upon said throttle lever body, said linkage means, and said carburetor operating member.

22. The power tool of claim 21 wherein:
said power tool is a flexible line trimmer, and
said rotationally drivable structure is a cutting head assembly.

23. The power tool of claim 21 wherein:
said engine is housed within a shroud stucture and
said linkage means extend from said handgrip to said carburetor operating member through said shroud structure.

24. The power tool of claim 21 wherein:
said carburetor operating member is a throttle arm pivotally associated with said carburetor.

25. The power tool of claim 21 wherein said power tool further comprises:
spring means, disposed within said housing, for biasing said lever body toward said first limit position thereof.

26. The power tool of claim 21 wherein:
said throttle lever housing is of a molded plastic material,
said lever body is of a generally rigid molded plastic material, and
said connecting arm means comprises an elongated, molded plastic connecting arm member fixedly secured at an inner end portion thereof to said lever body.

27. The power tool of claim 26 wherein:
said connecting arm member is integrally molded with said lever body.

28. The power tool of claim 21 wherein:
said side walls of said housing having side edge portions with aligned access notches formed therein,
said outer end portion of said connecting arm means is configured to receive and releasably retain a cable connector member,
said cable has a connector member secured to an end portion thereof and retained in said connecting arm means outer end portion, and
said throttle lever and said housing are relatively configured in a manner permitting said throttle lever, when said stop member is removed, to be pivoted outwardly beyond said first limit position to a cable connector access position in which said cable connector is aligned with said access notches to expose said connector member for access thereto.

29. The power tool of claim 28 wherein said power tool further comprises:
interengageable portions formed on said lever body and said housing for stopping said lever at said cable connector access position thereof.

* * * * *